United States Patent
Chang et al.

(10) Patent No.: US 6,951,394 B2
(45) Date of Patent: Oct. 4, 2005

(54) DIGITAL LIGHT PROCESSING PROJECTION SYSTEM AND PROJECTION METHOD OF THE SAME

(75) Inventors: Sean Chang, Taoyuan (TW); Sean Huang, Taoyuan (TW)

(73) Assignee: Delta Electronics, Inc. (TW)

( * ) Notice: Subject to any disclaimer, the term of this patent is extended or adjusted under 35 U.S.C. 154(b) by 43 days.

(21) Appl. No.: 10/712,519

(22) Filed: Nov. 12, 2003

(65) Prior Publication Data

US 2005/0030481 A1 Feb. 10, 2005

(30) Foreign Application Priority Data

Aug. 7, 2003 (TW) ........................... 92121612 A (51) Int. Cl.[7] ..................... G03B 21/00; G03B 21/28
(52) U.S. Cl. ................................. 353/33; 353/81
(58) Field of Search ...................... 353/33, 81; 359/834

(56) References Cited

U.S. PATENT DOCUMENTS

| | | | |
|---|---|---|---|
| 6,349,006 B1 * | 2/2002 | Okamori et al. | 359/834 |
| 6,560,048 B1 * | 5/2003 | Okamori et al. | 353/33 |
| 6,663,243 B2 * | 12/2003 | Fielding et al. | 353/33 |
| 6,840,634 B1 * | 1/2005 | Chang | 353/81 |
| 2005/0018146 A1 * | 1/2005 | Chang et al. | 353/98 |

* cited by examiner

Primary Examiner—Christopher E. Mahoney
(74) Attorney, Agent, or Firm—Martine Penilla & Gencarella, LLP (57) ABSTRACT

A digital light processing projection system includes an illuminating device, an optical-path-switching element, a projection device and a prism set. The prism set is arranged between the illuminating device, the optical-path-switching element and the projection device and has a plurality of prisms in which an air gap existing between any two adjacent prisms. According to the invention, a light beam output from the illuminating device directly passes through the prisms and air gaps before being received by the optical-path-switching element. Under a first state, a light beam reflected from the optical-path-switching element is totally reflected at an interface between one of the prisms and one of the air gaps before being received by the projection lens. Under a second state, a light beam reflected from the optical-path-switching element is totally internal reflected back and forth within a prism being adjacent to the optical-path-switching element and is absorbed by a light absorbing material.

20 Claims, 5 Drawing Sheets

DIGITAL LIGHT PROCESSING PROJECTION SYSTEM AND PROJECTION METHOD OF THE SAME

BACKGROUND OF THE INVENTION (a) Field of the Invention

The invention relates to an optical projection system and, more particularly, to a digital light processing (DLP) projection system and a projection method of the same.

(b) Description of the Related Art

The Digital light processing (DLP) technique has been developed by Texas Instrument since 1987. In a DLP projection system, an optical element called digital micromirror device (DMD) is utilized. On the digital micro mirror device there are thousands of micro-mirrors for reflecting light beams onto a screen to form an image. Each of these micro-mirrors has independent driving electrode, support post and steering shaft. When the DLP projection system is under a light state, light beams projected onto the micromirrors are reflected into a projection lens by these micromirrors and then focused on a screen. When the DLP projection system is under a dark state, these micro-mirrors are driven by applying a voltage to the driving electrodes and tilted to a specific angle, so that light beams projected onto the mirrors are reflected to other directions instead of reflected into the projection lens.

Figure 1A:
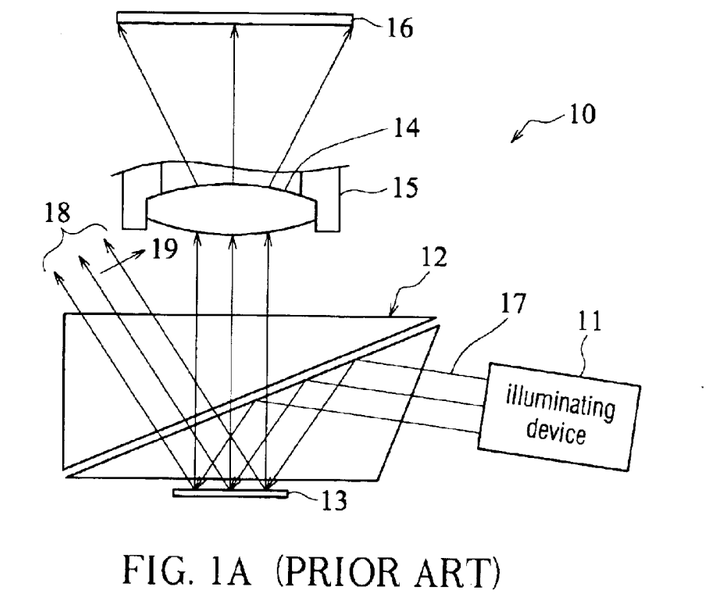
FIG. 1A is a schematic view showing a digital light processing (DLP) projection system of a prior art.

Referring to a usual DLP projection system 10 shown in FIG. 1A, when the projection system 10 is under a light state, inhomogeneous light beams from a light source are first converted into homogeneous incident light beams 17 via an illumination device 11, and then enter a prism set 12. The light beams 17 are totally internal reflected onto micromirrors (not shown) on a DMD 13, reflected into a projection lens 14 by these micro-mirrors, and projected onto a screen 16 in order. On the other hand, when the DLP projection system 10 is under a dark state, the micro-mirrors (not shown) on the DMD 13 deflects the incident light beams 17, so that the incident light beams 17 are deviated away from an optic axis of the projection lens 14 after passing through the prism set 12. To avoid unwanted light beams from entering the projection lens 14, a projection lens optical stop 15 is used for shielding deviation light beams 18 and stray light beams 19 coming from the light beams 17. In this DLP projection system 10, the design of the optical stop 15 is a crucial factor that affects contrast.

However, the prior DLP projection system 10 has certain drawbacks. First of all, since the prism set 12 reflects the homogeneous incident light beams 17 before they are projected onto the DMD 13 under a light state, chromatism is likely to happen due to dispersion effects of the prism set 12, which is not easily to be eliminated. Secondly, in order to ensure that the deviation light beams 18 and the stray light beams 19 would not enter the projection lens 14 under a dark state, a certain distance kept between the prism set 12 and the projection lens 14 is necessary, which, however, increases back focal distance and thus lowers image quality. Thirdly, adding extra optical stops to shield the deviation light beams 18 and the stray light beams 19 to provide a total dark state is an ordinary business. However, excessive optical stops may lower lumen of the projection system under a light state.

Figure 1B:
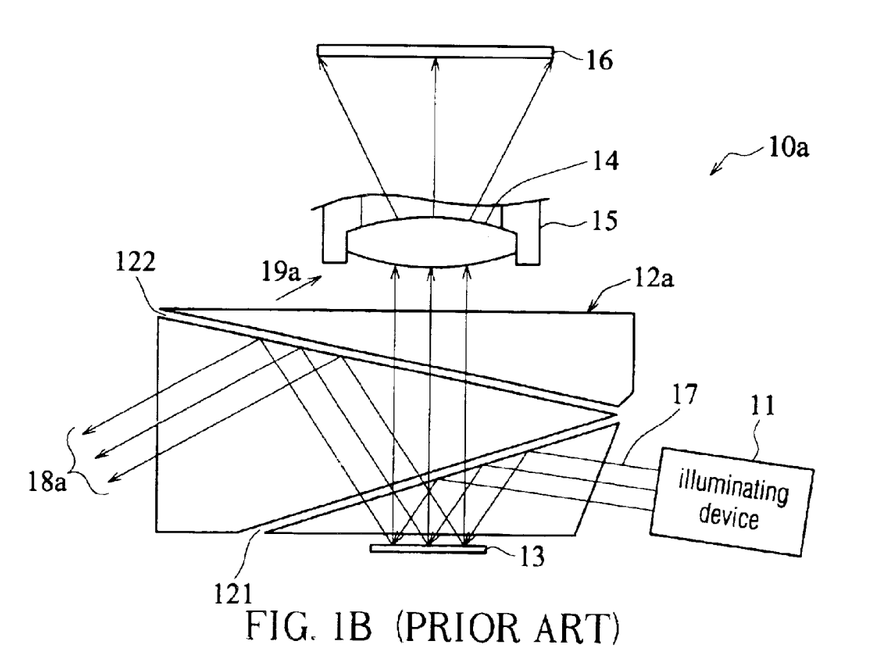
FIG. 1B is a schematic view showing a DLP projection system of another prior art.

FIG. 1B shows an optical system disclosed by the U.S. Pat. No. 5,604,624, in which a conception of reflecting light beams from reflecting mirrors of a DMD to other directions using a second air gap under a dark state is revealed.

Referring to FIG. 1B, under a light state of a projection display optical system 10a, the inhomogeneous light beams coming from a light source pass through an illumination device 11 and are converted into homogeneous incident light beams 17, and enter a prism set 12a. The homogeneous incident light beams 17 are totally internal reflected at an interface between the prism set 12a and a first air gap 121, and projected to micro mirrors (not shown) on a DMD 13. The incident light beams 17 are then reflected into a projection lens 14 by these micro mirrors and further projected onto a screen 16. Whereas, when the projection display optical system 10a is under a dark state, the micro mirrors (not shown) on the DMD 13 deflect the incident light beams 17, such that the incident light beams 17 are totally internal reflected at an interface between the prism set 12a and a second air gap 122 and then deviated away from an optical axis of the projection lens 14. Also a projection lens optical stop 15 is utilized for shielding deviation light beams 18a and stray light beams 19a to prevent these unwanted light beams from entering the projection lens 14.

However, when this prior system is under a dark state, it is likely that part of the stray light beams 19a from the deviation light beams 18a still enter the projection lens 14. Hence, it is necessary to maintain a certain distance between the prism set 12a and the projection lens 14 or to provide an additional optical stop. As a result, a back focal distance of the system would be large and lumen of the system would be lowered. Under such circumstances, image quality and contrast of the projection display optical system 10a would be inevitably affected.

Therefore, the present invention provides a digital light processing (DLP) projection system in order to overcome issues and difficulties in the prior art. Without affecting brightness of the system, the DLP projection system according to the invention has a shortened back focal distance and effectively solves the stray light issue.

SUMMARY OF THE INVENTION

The invention is proposed in view of the difficulties prior DLP projection systems experienced.

The object of the invention is to provide a digital light processing (DLP) projection system which is capable of effectively and thoroughly preventing deviation light beams and stray light beams under a dark state from entering the projection system.

The other object of the invention is to provide a DLP projection system that has a shortened back focal distance and an optical stop design considering only status of light state of the projection system.

The principle according to the invention is implemented by operating a total internal reflection (TIR) prism set and external air gaps in a reverse manner.

According to the invention, a DLP projection system includes an illuminating device, an optical-path-switching element, a projection device and a prism set. The illuminating device has a light source for outputting light beams. The optical-path-switching element is provided with a plurality of micro mirrors for receiving the light beams emitted by the light source and reflecting the light beams under a light state and a dark state. The projection device has a projection lens for receiving the light beams reflected from the optical-path-switching element under the light state.

The prism set of the invention is arranged between the illuminating device, the optical-path-switching element and the projection device. Wherein, the prism set has a plurality of prisms with an air gap existing between any two adjacent prisms.

More particularly, the light beams output from the illuminating device directly pass through the prisms and air gaps of the prism set before being received by the optical-path-switching element. Under a light state, the light beams reflected from the optical-path-switching element are totally reflected at an interface between one of the prisms and one of the air gaps next to of the prism set before being received by the projection lens. Under a dark state, the light beams reflected from the optical-path-switching element are totally internal reflected back and forth within the prism adjacent to the optical-path-switching element.

Furthermore, a projection method of the DLP projection system disclosed by the invention includes the steps of: guiding the light beams output from the illuminating device into the prism set, and having the light beams pass through the prism set without being reflected to the optical-path-switching element; reflecting the light beam reaching the optical-path-switching element under a first state back to the prism set, and having the light beams enter the projection device after being totally reflected; and reflecting the light beams reaching the optical-path-switching element under a second state back to the prism set, and having the light beam be totally reflected at a interface between the first-encountered air gap and one of the prisms next to the first-encountered air gap and then be totally internal reflected back and forth in the prism.

The invention has the advantages of: 1) shortening a back focal distance of the projection system; 2) effectively maintaining contrast and lumen of the projection system; and 3) ensuring that stray lights would not enter the projection lens.

DETAILED DESCRIPTION OF THE PREFERRED EMBODIMENTS

Figure 2A:
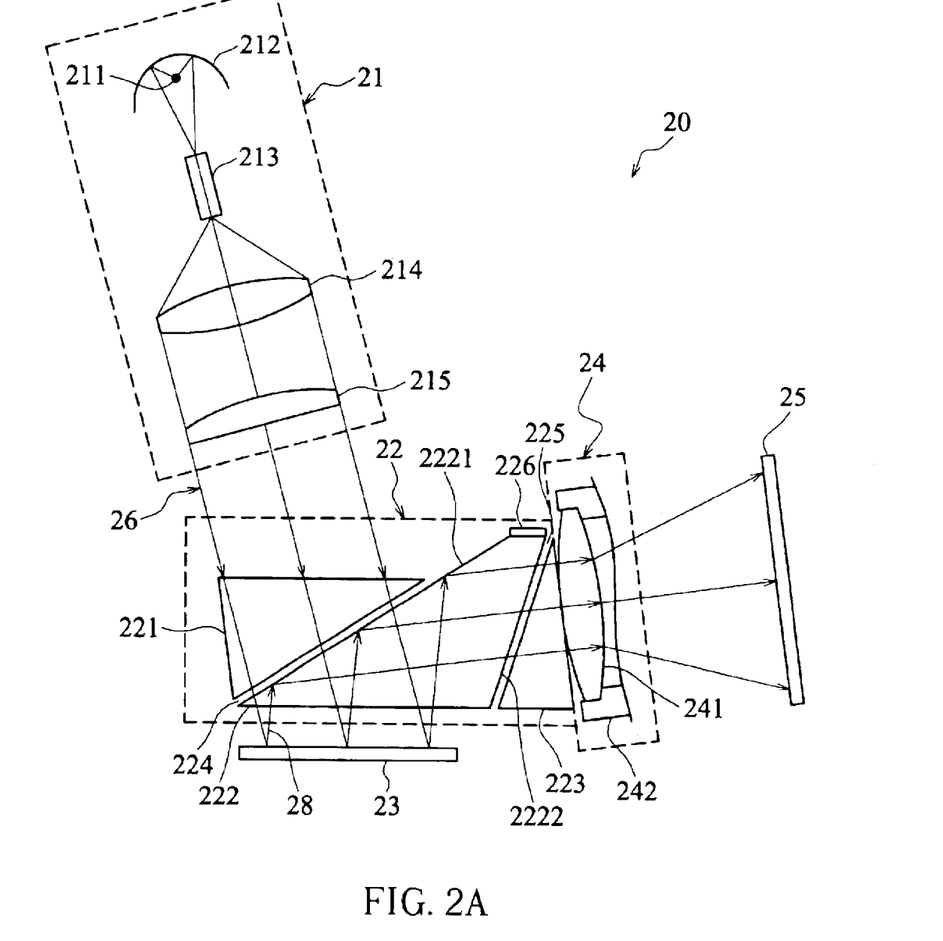
FIG. 2A is a schematic view showing a DLP projection system and a projection method of the same under a light state according to a first embodiment of the invention.
Figure 2B:
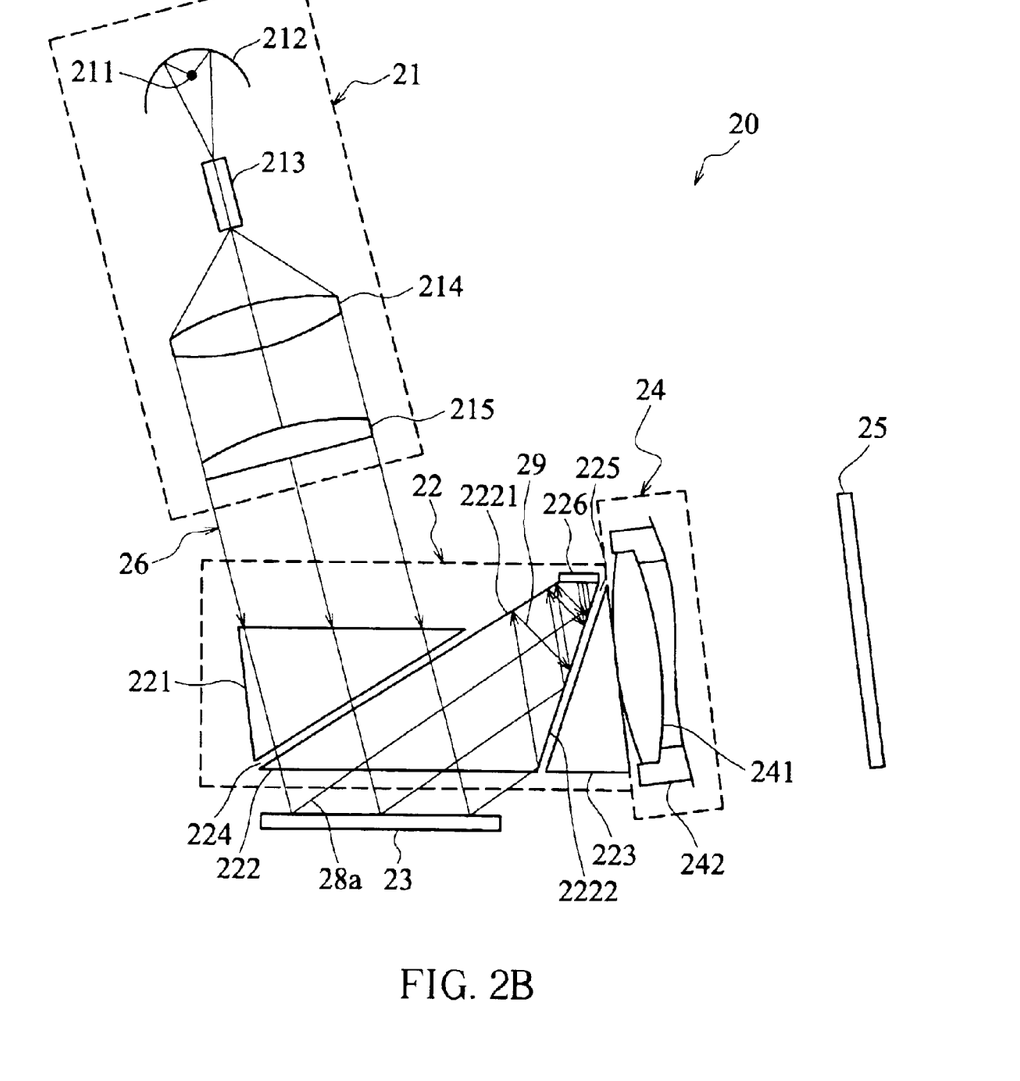
FIG. 2B is a schematic view showing a DLP projection system and a projection method of the same under a dark state according to a first embodiment of the invention.

Referring to FIGS. 2A and 2B, a digital light processing (DLP) projection system 20 according to a first embodiment of the invention includes an illuminating device 21, a prism set 22, an optical-path-switching element 23, and a projection device 24. The prism set 22 is arranged between the illuminating device 21, the optical-path-switching element 23, and the projection device 24. Detailed descriptions for the elements of the DLP projection system 20 are given below.

The illuminating device 21 in this embodiment has a light source 211, a lampshade 212, a light guide 213, a relay lens 214 and a light collector lens 215. The configuration of the light source 211, the lampshade 212 and the light guide 213 enables light beams emitted by the light sources 211 to enter the light guide 213 and enter the prism set 22 after passing through the relay lens 214 and the collector lens 215. In addition, a plurality of micro-mirrors (not shown) provided on the optical-path-switching element 23 are driven and rotated when the light beams emitted by the light source 211 enter the optical-path-switching element 23, thereby switching optical paths of the light beams and reflecting the light beams at different angles.

The prism set 22 in this embodiment has three prisms 221, 222 and 223. Between the prism 221 and the prism 222 is an air gap 224, and between the prism 222 and the prism 223 is an air gap 225. Existence of the air gaps 224 and 225 is to make light beams 28 reflected by the optical-path-switching element 23 be totally internal reflected at an interface 2221 between the prism 222 and the air gap 224, and to make light beams 28a reflected by the optical-path-switching element 23 be totally internal reflected at an interface 2222 between the prism 222 and the air gap 225. In this embodiment, the prism 222 further provides in the surrounds with a light absorbing material 226 to absorb light beams 29 being totally internal reflected back and forth within the prism 222.

In this embodiment, the light beams 26 coming from the illuminating device 21 does not undergo total internal reflection within the prism set 22 before reaching the optical-path-switching element 23 and after entering the prism set 22. To be more exact, the light beams 26 directly pass through the prism 221, the air gap 224 and the prism 222 in sequence and reach the optical-path-switching element 23. Thus, the prism set 22 is distinct from the prism set 12 of the aforesaid prior technique, in which the incident light beams 17 coming from the illuminating device 11 are first reflected to the DMD 13.

The projection device 24 in this embodiment has a projecting lens 241 and an optical stop 242. The projection lens 241 receives the light beams reflected by the optical-path-switching element 23 and passing through the prism set 22, as well as projects the light beams onto the screen 25. The optical stop 242 is used for shielding against unwanted light beams from entering the projection lens 241.

Projection means of the DLP projection system 20 in this embodiment shall be described in regard to a light state and a dark state.

Referring to FIG. 2A, under a light state, the light beams 26 output by the illuminating device 21 directly pass through the prism 221, the air gap 224 and the prism 222 in sequence and reach the optical-path-switching element 23. Then, the micro-mirrors (not shown) on the optical-path-switching element 23 reflect the incident light beams 26 to the interface 2221 between the prism 222 and the air gap 224. The reflected light beams 28 undergo total internal reflection at the interface 2221, pass through the prism 223, and are received and projected onto the screen 25 by the projection lens 241.

Referring to FIG. 2B, under a dark state, the light beams 26 output by the illuminating device 21 also directly pass through the prism 221, the air gap 224 and the prism 222 in sequence, and reach the optical-path-switching element 23. However, the inclined angle of each micro-mirror on the optical-path-switching element 23 is adjusted to enable the incident light beams 26 to be reflected onto the interface 2222 between the air gap 225 and the adjacent prism 222 to the optical-path-switching element 23, and enable the reflected light beams 28a to incessantly undergo total internal reflection between the interfaces 2222 and 2221. Light beams 29 that incessantly undergo total internal reflection within the prism 222 are shortly absorbed by the light absorbing material 226 provided in the surrounds of the prism 222 in order to prevent the light beams 28a reflected from the optical-path-switching element 23 and the stray light beams thereof from entering the projection lens 241.

It is to be noted that the light beams 28a reflected from the optical-path-switching element 23 are entirely deviated away from the projection lens 241 of the projection device 24 under a dark state (or a dark state) in this embodiment, so that the projection lens 241 can be located close to the prism 223 of the prism set 22. That is, a distance between the prism 223 of the prism set 22 and the projection lens 241 can be nearly zero.

Figure 3A:
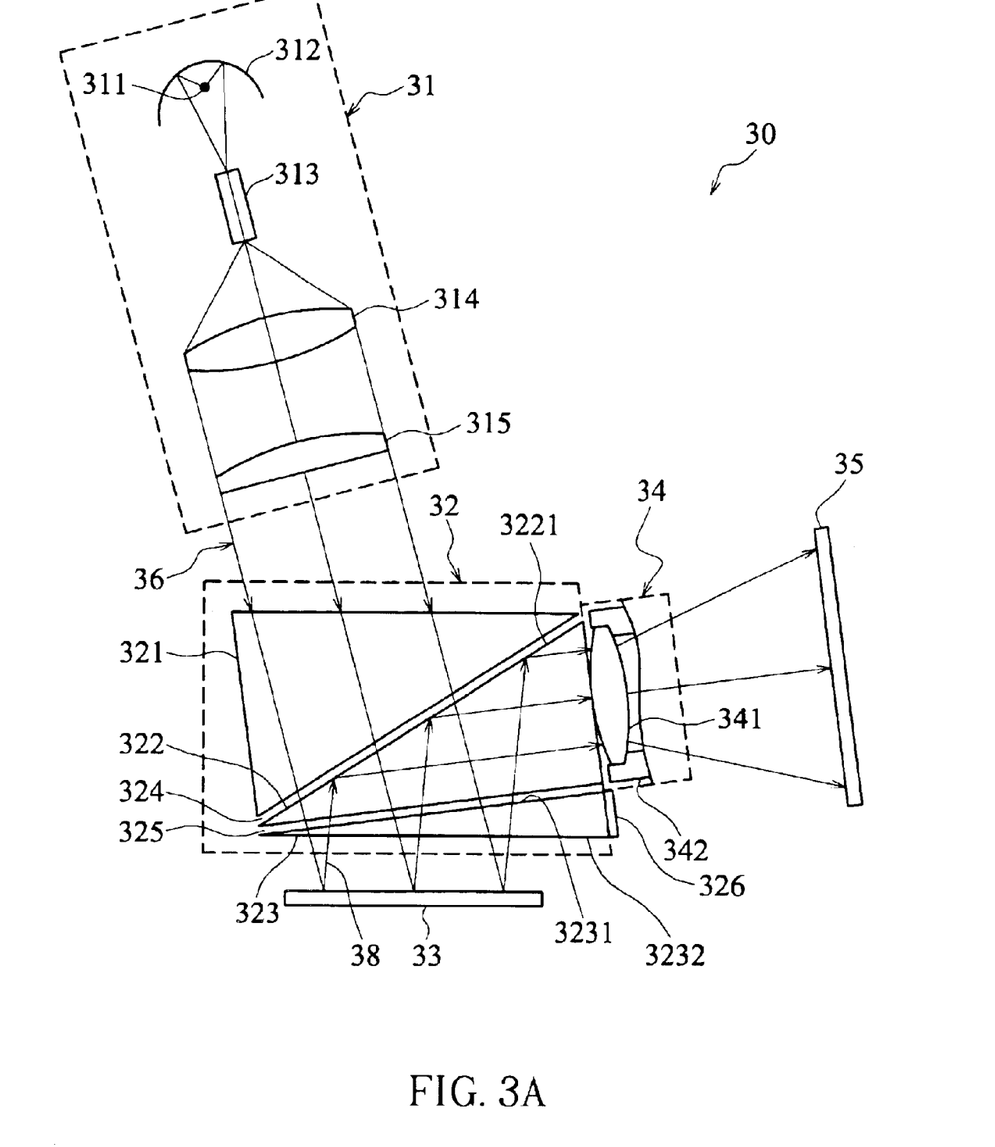
FIG. 3A is a schematic view showing a DLP projection system and a projection method of the same under a light state according to a second embodiment of the invention.
Figure 3B:
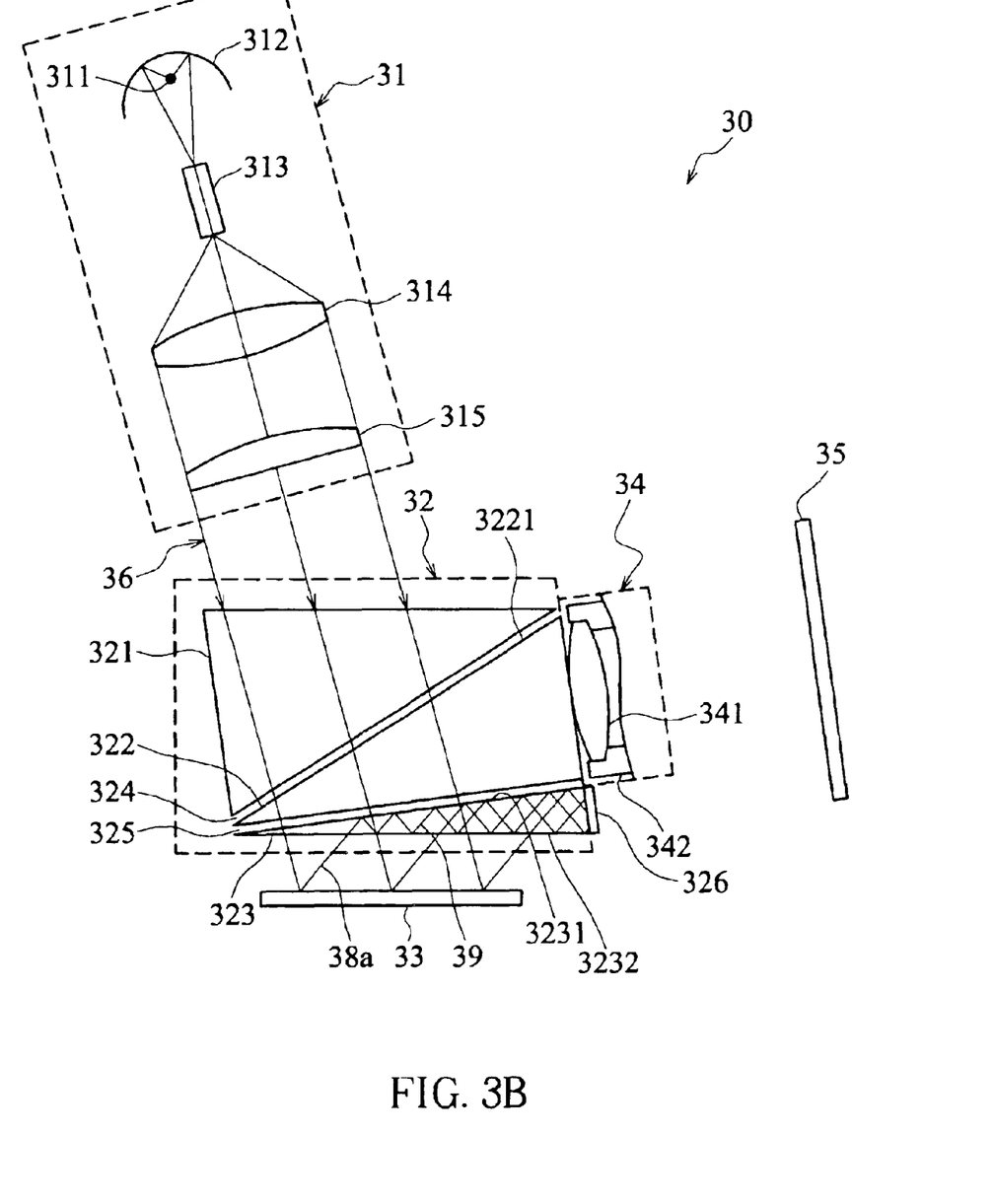
FIG. 3B is a schematic view showing a DLP projection system and a projection method of the same under a dark state according to a second embodiment of the invention.

Referring to FIGS. 3A and 3B, a DLP projection system 30 according to a second embodiment of the invention includes an illuminating device 31, a prism set 32, an optical-path-switching element 33 and a projection device 34. The prism set 32 is arranged between the illuminating device 31, the optical-path-switching element 33 and the projection device 34. The optical-path-switching element 33 is provided with a plurality of micro-mirrors (not shown) on it, the inclined angles of which are so adjustable that the optical paths of light beams 36 coming from the illuminating device 31 can be switched. The elements of the DLP projection system 30 according to the second embodiment are illustrated below.

In this embodiment, the illuminating device 30 has a light source 311, a lampshade 312, a light guide 313, a relay lens 314 and a collector lens 315. The light source 311, the lampshade 312 and the light guide 313 are configured in a certain relationship, which allows light beams emitted from the light sources 311 to enter the light guide 313, pass through the relay lens 314 and the collector lens 315, and enter the prism set 32.

Meanwhile, the prism set 32 in this embodiment has three prisms 321, 322 and 323. Between the prism 321 and the prism 322 is an air gap 324, and between the prism 322 and the prism 323 is an air gap 325. Existence of the air gaps 324 and 325 enables light beams 38 reflected by the optical-path-switching element 33 to undergo total internal reflection at an interface 3221 between the prism 322 and the air gap 324, and enables light beams 38a reflected by the optical-path-switching element 33 to undergo total internal reflection at an interface 3231 between the prism 322 and the air gap 325. In addition, the prism 323 further provides a light absorbing material 326 in the surrounds, in order that the light absorbing material 326 absorbs light beams 39 undergoing total internal reflection within the prism 222.

In this embodiment, the light beams 36 coming from the illuminating device 31 do not undergo total internal reflection within the prism set 32 after entering the prism set 32 and before reaching the optical-path-switching element 33. To be more exact, the light beams 36 directly pass through the prism 321, the air gap 324, the prism 322, the air gap 325 and the prism 323 in sequence and reach the optical-path-switching element 33. This process is distinct from the aforesaid prior technique, in which the incident light beams 17 coming from the illuminating device 11 are first reflected to the prism set 12 at the DMD 13.

The projection device 34 in this embodiment has a projecting lens 341 and an optical stop 342. The projection lens 341 is to receive the light beams reflected by the optical-path-switching element 33 and passing through the prism set 32, and to project the light beams onto the screen 35. The optical stop 342 is to prevent stray light beams from entering the projection system 30.

Projection means of the DLP projection system 30 in this embodiment shall be described in regard to a light state and a dark state.

Referring to FIG. 3A, the light beams 36 output by the illuminating device 31 directly pass through the prism 321, the air gap 324, the prism 322, the air gap 325 and the prism 323 in sequence and reach the optical-path-switching element 33 under a light state. Then, the micro-mirrors on the optical-path-switching element 33 reflect the incident light beams 36 to the interface 3221 between the prism 322 and the air gap 324. The reflected light beams 38 undergo total internal reflection at the interface 3221, and are directly received and projected onto the screen 35 by the projection lens 341.

Referring to FIG. 3B, the light beams 36 output by the illuminating device 31 also directly pass through the prism 321, the air gap 324, the prism 322, the air gap 325 and the prism 323 in sequence, and reach the optical-path-switching element 33 under a dark state. However, inclined angles of the micro-mirrors on the optical-path-switching element 33 are adjusted to enable incident light beams 38a to be reflected onto the interface 3231 between the adjacent prism 323 to the optical-path-switching element 33 and the air gap 325, and enable the reflected light beams 38a to incessantly undergo total internal reflection between the interfaces 3231 and 3232. Light beams 39 that incessantly undergo total internal reflection within the prism 323 are shortly absorbed by the light absorbing material 326 provided in the surrounds, in order to prevent the light beams 38a reflected from the optical-path-switching element 33 from entering the projection lens 341.

It is to be noted that in this embodiment the light beams 38a reflected from the optical-path-switching element 33 are entirely deviated away from the projection lens 341 of the projection device 34 under a dark state (or a dark state), so that the projection lens 341 may be located closely to the prism 322 of the prism set 32. To be more precise, a distance between the prism 322 of the prism set 32 and the projection lens 341 is zero.

In the first and second embodiments according to the invention, under a dark state, the light beams 26 and 36 emitted from the illuminating devices 21 and 31 are reflected to certain prisms 222 and 323 of the prism sets 22 and 32 by the mirrors on the optical-path-switching elements 23 and 33 to undergo incessant total internal reflection. Therefore, the projection lenses of the projection systems do not receive light beams or strayed light beams reflected from the mirrors at the optical-path-switching elements 23 and 33. More particularly, the invention, by utilizing the light absorbing media 226 and 326 to absorb the light beams that are limited within the prisms through effect of total reflection, ensures that any stray light beams could not enter the projection lenses of the projection systems. Consequently, contrast of projected images is improved.

Meanwhile, because all stray light beams tending to enter the projection lenses are deviated away from the projection systems, the projection lenses are allowed to stay closely to the prism sets to further shorten back focal distances.

Also, the system according to the invention is free from affects of stray light beams that are virtually absent under a dark state, it is therefore only image forming requirements under light state is necessary to be considered into the arrangement for optical stops, and additional optical stop to avoid stray light beams under a dark state are unneeded. Accordingly, the system brightness and contrast is reinforced and advantages the entire system.

The embodiments and examples according to the invention are fully illustrated as in the above descriptions. For those who are skilled in this art, it is understood that the embodiments according to the invention are illustrative but not limitative. Without departing from the true spirit and scope of the invention, various modifications and changes to the aforesaid DLP system and the projection method thereof shall be included by the appended claims of the invention.

What is claimed is:

1. A digital light processing projection system comprising:
   an illuminating device having a light source outputting a light beam;
   an optical-path-switching element having a plurality of micro-mirrors for receiving the light beam and reflecting the light beam under a first state and a second state, respectively;
   a projection device having a projection lens for receiving the light beam reflected from the optical-path-switching element under the first state; and
   a prism set arranged between the illuminating device, the optical-path-switching element, and the projection device, having a plurality of prisms in which an air gap exists between any two adjacent prisms;
   wherein, the light beam output from the illuminating device directly passes through the prisms and air gaps of the prism set before being received by the optical-path-switching element; the light beam reflected from the optical-path-switching element is totally reflected at an interface between one of the prisms and one of the air gaps before being received by the projection lens under the first state; and the light beam reflected from the optical-path-switching element is totally reflected back and forth within one of the prisms being adjacent to the optical-path-switching element under the second state.

2. The digital light processing projection system as described in claim 1, wherein the prism being adjacent to the optical-path-switching element is provided with light absorbing material in the surrounds.

3. The digital light processing projection system as described in claim 1, wherein a distance between the prism set and the projection lens is zero.

4. The digital light processing projection system as described in claim 1, wherein the illuminating device further includes a light guide and a relay lens.

5. The digital light processing projection system as described in claim 1, wherein the projection device is further provided with an optical stop.

6. The digital light processing projection system as described in claim 1, wherein the prism set has a first prism, a second prism, a third prism, a first air gap existing between the first prism and the second prism, and a second air gap existing between the second prism and the third prism; the light beam output from the illuminating device passes through the first prism, the first air gap and the second prism in sequence before being received by the optical-path-switching element; the light beam reflected from the optical-path-switching path is totally reflected at an interface between the second prism and the first air gap and then passes through the third prism before being received by the projection lens under the first state; and the light beam reflected from the optical-path-switching element is totally internal reflected back and forth within the second prism under the second state.

7. The digital light processing projection system as described in claim 6, wherein the second prism is provided with light absorbing material in the surrounds.

8. The digital light processing projection system as described in claim 6, wherein a distance between the third prism and the projection lens is zero.

9. The digital light processing projection system as described in claim 6, wherein the illuminating device further has a light guide and a relay lens.

10. The digital light processing projection system as described in claim 6, wherein the projection device is provided with an optical stop.

11. The digital light processing projection system as described in claim 1, wherein the prism set has a first prism, a second prism, a third prism, a first air gap existing between the first prism and the second prism, and a second air gap existing between the second prism and the third prism; the light beam output from the illuminating device passes through the first prism, the first air gap, the second prism, the second air gap and the third prism in sequence; the light beam output from the optical-path-switching element is totally reflected at an interface between the second prism and the first air gap before being received by the projection lens under the first state; and the light beam reflected from the optical-path-switching element is totally internal reflected back and forth within the third prism under the second state.

12. The digital light processing projection system as described in claim 11, wherein the second prism is provided with light absorbing material in the surrounds.

13. The digital light processing projection system as described in claim 11, wherein a distance between the third prism and the projection lens is zero.

14. The digital light processing projection system as described in claim 11, wherein the illuminating device further includes a light guide and a relay lens.

15. The digital light processing projection system as described in claim 11, wherein the projection device is provided with an optical stop.

16. A projection method of a digital light processing projection system, wherein the digital light processing projection system has at least an illuminating device, an optical-path-switching element, a projection device, and a prism set having a plurality of prisms and air gaps, comprising the steps of:
   guiding a light beam output from the illuminating device into the prism set, and having the light beam pass through the prism set without being reflected and reach the optical-path-switching element;
   reflecting the light beam reaching the optical-path-switching element back to the prism set and then having the light beam be totally reflected into the projection device under a first state;
   reflecting the light beam reaching the optical-path-switching element back to the prism set and then having the light beam be totally reflected at a interface between a first-encountered air gap and one of the prisms and then totally internal reflected back and forth within the prism next to the first-encountered air gap under a second state; and
   absorbing the light beam being totally internal reflected back and forth within the prism next to the first-encountered air gap under the second state.

17. The projection method of a digital light processing projection system as described in claim 16 further comprising the steps of:
   projecting the light beam entering the projection device under the first state into a screen.

18. The projection method of a digital light processing projection system as described in claim 16, wherein the prism set has a first prism, a second prism, a third prism, a first air gap existing between the first prism and the second prism, and a second air gap existing between the second prism and the third prism.

19. The projection method of a digital light processing projection system as described in claim 18, wherein the light beam output from the illuminating device passes through the first prism, the first air gap and the second prism in sequence when being guided into the prism set; the light beam reaching the optical-path-switching element is reflected to an interface between the first prism and the first air gap under the first state; and the light beam reaching the optical-path-switching element is reflected to an interface between the second prism and the second air gap under the second state.

20. The projection method of a digital light processing projection system as described in claim 18, wherein the light beam output from the illuminating device passes through the first prism, the first air gap, the second prism, the second air gap and the third prism in sequence when being guided into the prism set; the light beam reaching the optical-path-switching element is reflected to an interface between the first prism and the first air gap under the first state; and the light beam reaching the optical-path-switching element is reflected to an interface between the third prism and the second air gap under the second state.

* * * * *